Dec. 3, 1929.　　　M. SMITHEY　　　1,737,808
METER
Original Filed Jan. 6, 1917　　3 Sheets-Sheet 1

WITNESSES

INVENTOR
MARVIN SMITHEY
BY
ATTORNEYS

Dec. 3, 1929. M. SMITHEY 1,737,808
METER
Original Filed Jan. 6, 1917 3 Sheets-Sheet 2
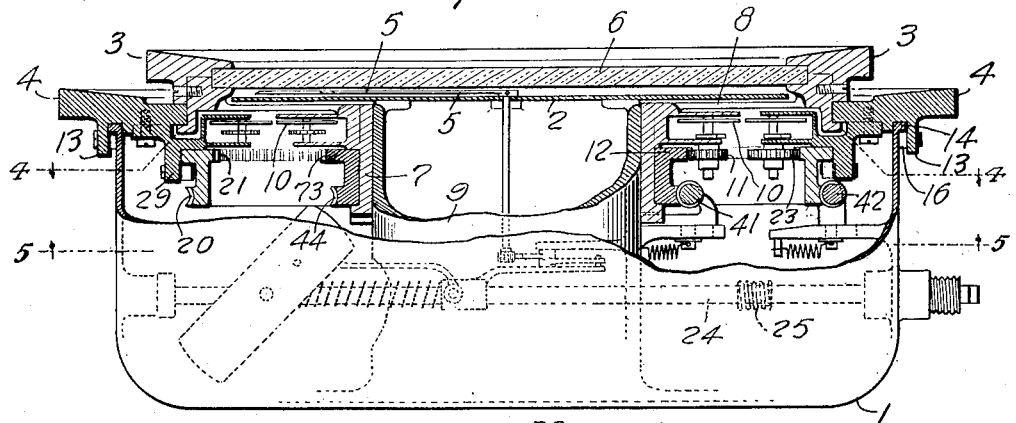
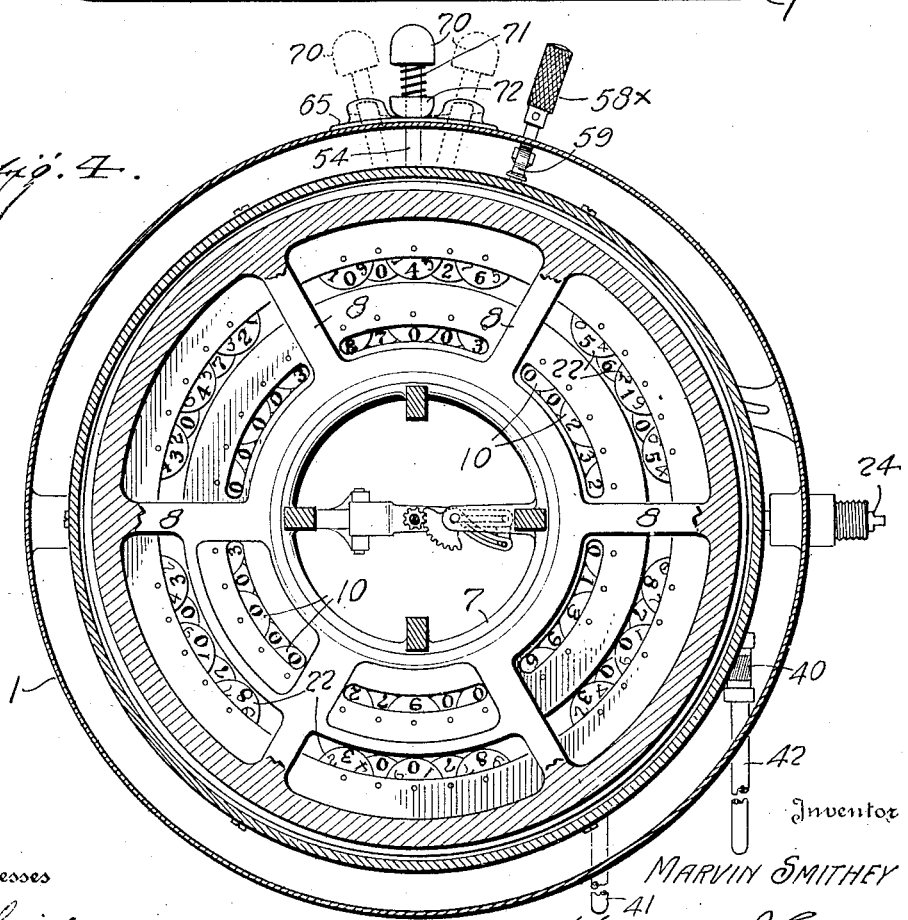
Witnesses
Inventor
MARVIN SMITHEY
By
Attorneys

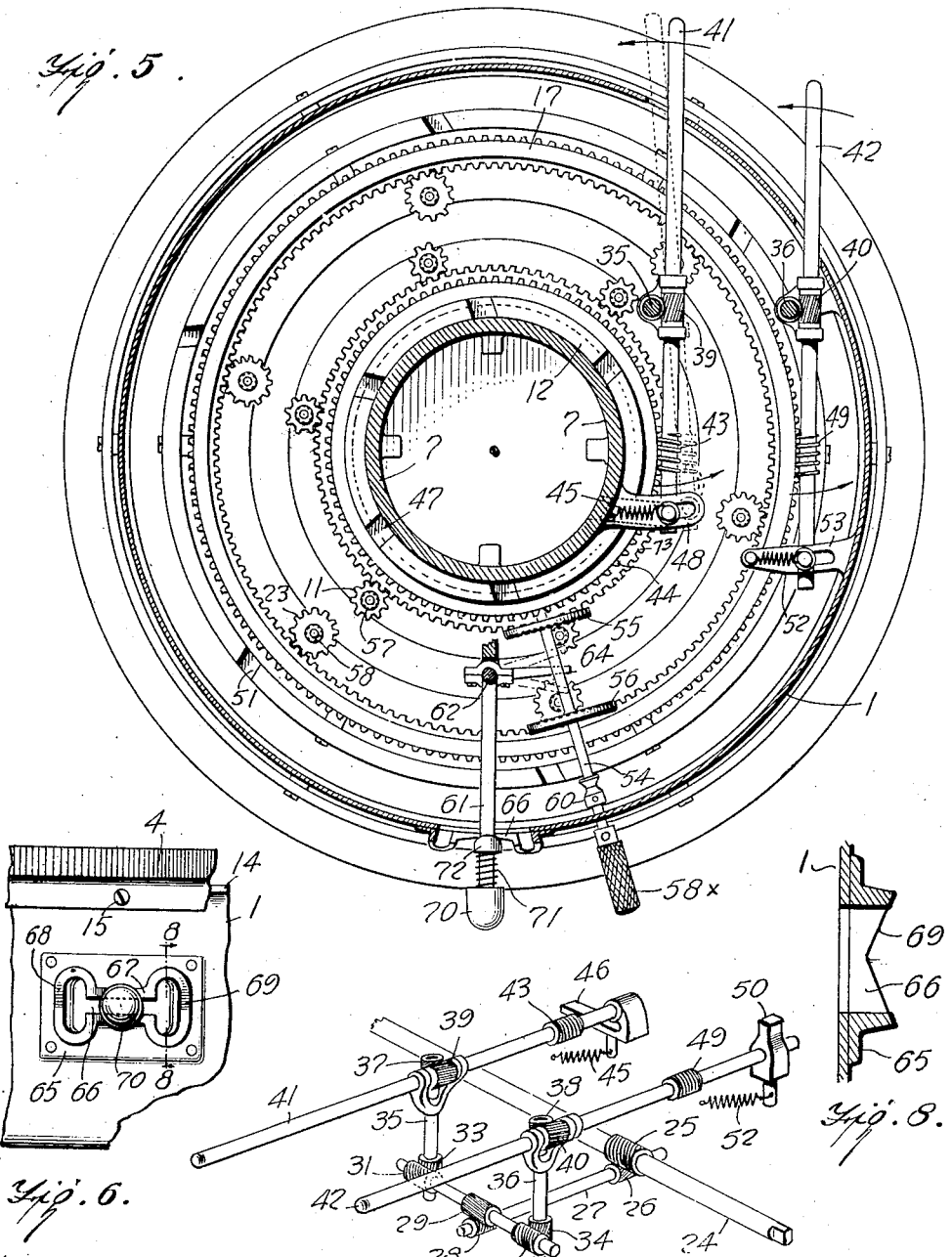

Patented Dec. 3, 1929

1,737,808

UNITED STATES PATENT OFFICE

MARVIN SMITHEY, OF LAWRENCEVILLE, VIRGINIA, ASSIGNOR TO L. P. SMITHEY AND NELLIE C. SMITHEY, BOTH OF ROANOKE, VIRGINIA

METER

Application filed January 6, 1917, Serial No. 140,974. Renewed April 23, 1923.

This invention relates to meters designed chiefly to be mounted upon motor vehicles to designate mileage of various elements associated therewith upon which it is desirable to keep tally.

This invention relates more particularly to that type of instrument disclosed in my prior application, Serial Number 138,837, filed Dec. 26, 1916, in which a plurality of sets of flat disk odometers is mounted in a casing and driven by a common driving means, the present invention being an improvement thereon.

The invention aims to provide novel means for throwing the registering mechanisms as a whole into or out of operative position, as also to devise peculiar locking means to positively hold the registering mechanisms in engagement with the driving means under normal conditions.

The invention also has for its object to supply means to admit of any selected registering mechanism being thrown out of action when it is not required to have the same operate, said means normally occupying a neutral position, and adapted to be manually operated to select any registering mechanism, and to move the same to the starting or any other desired position.

The invention further aims to provide driving mechanism of peculiar construction and arrangement which will readily admit of the setting of the instrument to bring any required registering mechanism into reading position, without actuating the registering mechanism during the adjustment thereof.

The invention furthermore relates to the provision of novel mountings for the several parts, and to the combinations of elements which hereinafter will more fully appear, reference being had to the accompanying drawings and the following description.

The drawings illustrate the preferred embodiment of the invention, although it is to be understood that within the scope of the appended claims changes in the form, proportion and minor details of construction may be resorted to without departing from the nature of the invention when adapting the same to special requirements, or to meet existing conditions.

For a full understanding of the invention, reference is to be had to the following description and the drawings hereto attached, in which corresponding and like parts are designated by the same reference characters.

Figure 3 is a side view of the indicator partly in section and with a portion of the casing broken away.

Figure 4 is a horizontal section on the line 4—4 of Figure 3.

Figure 5 is an enlarged section on the line 5—5 of Figure 3 looking in the direction of the arrows.

Figure 6 is a detail view of a portion of the casing, showing the means whereby the lever may be moved to throw selected registering mechanisms into or out of operative position.

Figure 7 is a detail perspective view of the driving mechanism and the locking means for holding the driving mechanism in normal position.

Figure 8 is an enlarged section on the line 8—8 of Figure 6.

Figure 1:
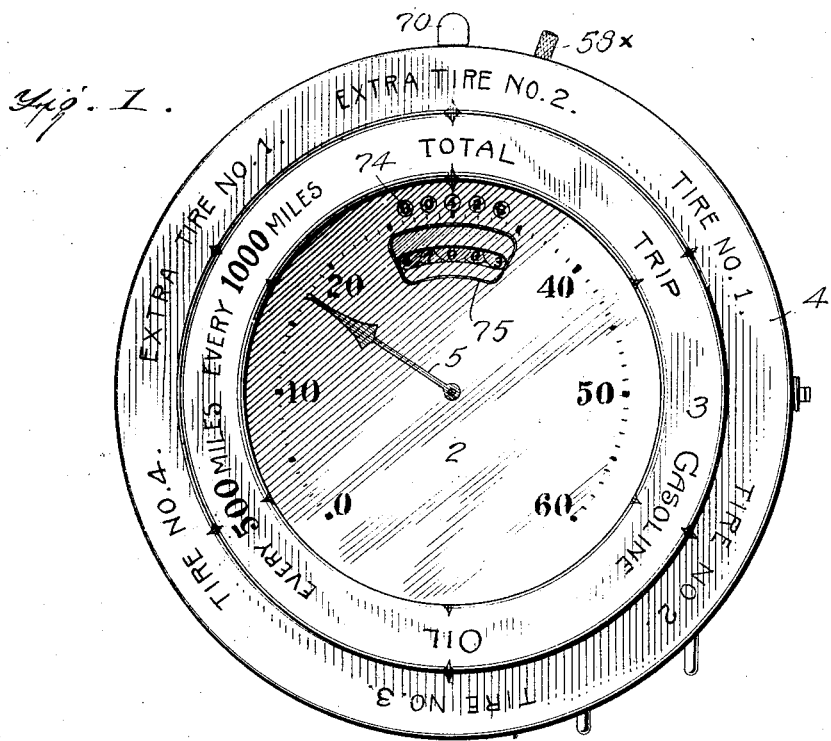
Figure 1 is a front view of an indicator constructed in accordance with and embodying the essential features of the invention.

The working parts are disposed within and mounted upon a suitable casing 1, which may be of any design or construction. A plurality of dials are provided and have a concentric arrangement, certain dials being movable to admit of the required registering mechanism being brought into a given position to be read.

In the present instance three dials 2, 3 and 4 are employed. The dial 2 is fixed, whereas the dials 3 and 4 are rotatable. The several dials are located at the open side of the casing and the dials 3 and 4 are disposed for convenience of adjustment to bring the required registering mechanism into a predetermined position. A hand 5 is movable over the dial 2 and is mounted in any well known manner so as to act in conjunction with numerals on the dial to indicate the rate of speed.

The manner of mounting the hand 5 and the style of actuating mechanism therefor are unimportant, and form no part of the present invention. Each of the dials 3 and 4 is of annular formation, and have parts disposed in different relative planes to admit of the dial being conveniently grasped, when it is desired to rotate the dial to bring any required registering mechanism into a given position.

The inner dial 3 has a transparent disk or cover 6 fitted thereto, for enclosing the dial 2 and hand 5. A ring 7 is connected with the dial 3 by means of arms 8 whereby the dial and ring are adapted to move in unison. The ring 7 is mounted upon a column 9, which is disposed centrally within the casing 1 and may form a part of the supporting frame.

A plurality of registering mechanisms 10 is suitably mounted upon the ring 7, so as to move therewith, whereby any desired registering mechanism may be brought into a predetermined position. The registering mechanisms 10 are preferably of the flat disk type, such as that described in my prior application aforesaid, and each is adapted to be actuated by means of a gear element 11 in conjunction with a driving gear 12 which is rotatably mounted upon ring 7. The gear elements 11 are movable to admit of the registering mechanisms being thrown into or out of meshing engagement with the drive gear 12.

Suitable means are provided for moving the gear elements 11 and the same will be described more fully hereinafter.

The dial 4 is supported directly upon the casing 1, and has a depending flange 13 which encircles an outer flange 14 at the open side of the casing 1. Studs 15 are mounted in the flange 13, and their inner ends receive rollers 16 which engage under the offstanding flange 14, thereby retaining the dial 4 in place. The arrangement of the parts is such as to admit of the dial 4 being easily rotated. The outer edges of the dials 3 and 4 are milled or otherwise roughened to admit of a firm grip being obtained thereon when it is desired to rotate the dials to bring the required registering mechanism into given position.

Figure 2:
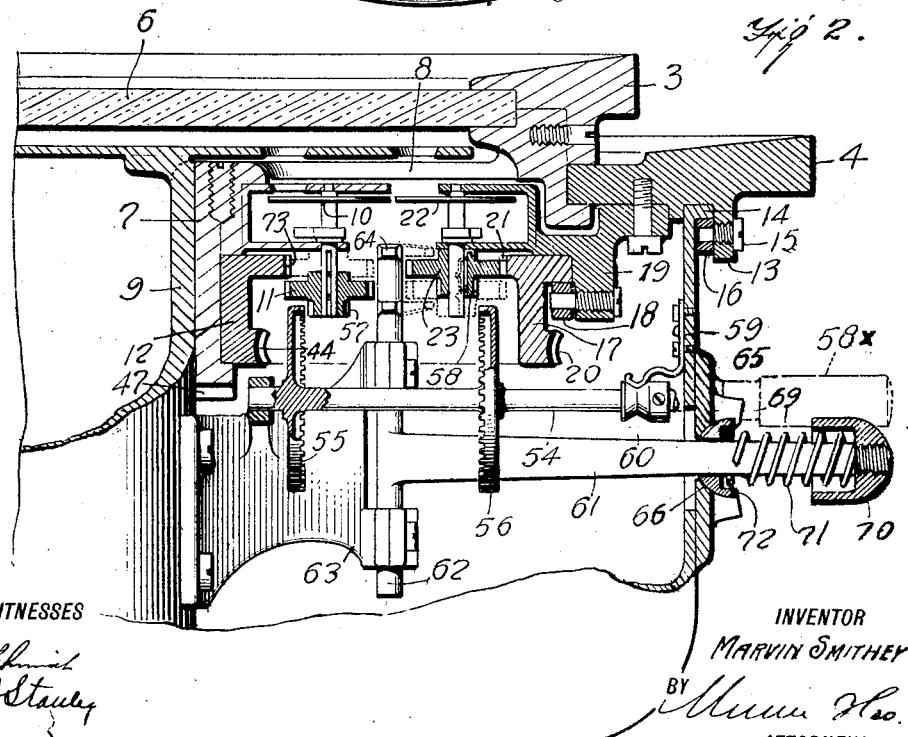
Figure 2 is an enlarged sectional view of a side portion of the indicator, the full and dotted lines indicating the registering mechanisms thrown into and out of operative position.

The dial 3 is rotatably mounted upon the dial 4, as indicated most clearly in Figure 2, and the grip rings of the dials are disposed in different relative planes to admit of either being gripped without interfering with the remaining dial. A drive gear 17 is rotatably mounted upon the dial 4 and is supported upon rollers 18 mounted upon studs disposed in openings formed in a flange 19 forming a part of the dial structure 4. The drive gear 17 is somewhat similar in construction to the drive gear 12, since it is of annular formation, and is provided with worm teeth 20 and cog teeth 21.

The dial 4 is provided with a plurality of registering mechanisms 22, preferably of the disk type. Each of the registering mechanisms 22 is provided with a gear element 23, which is movable upon its supporting shaft to admit of the gear element being thrown into or out of meshing engagement with the cog gearing 21, as indicated by the full and dotted lines in Figure 2.

The gear elements 11 and 23 constitute in effect driven members of the respective registering mechanisms 10 and 22, and the elements 12 and 17 may be regarded as driving members. When the vehicle is in motion the elements 12 and 17 are constantly driven from a moving part of the mechanism, and impart a motion to the several registering mechanisms which are geared thereto.

The driving shaft is indicated at 24, and may be connected in any well known manner to a moving part of the mechanism of the vehicle. As shown most clearly in Figure 7, the drive shaft 24 is provided with a worm gear 25, which is in mesh with a corresponding worm gear 26 on a shaft 27, the latter being provided with a worm gear 28 in mesh with a worm gear 29 on a shaft 30, the latter being provided with worm gears 31 and 32 which are in mesh with worm gears 33 and 34 respectively, carried by shafts 35 and 36. The shafts 35 and 36 are provided with worm gears 37 and 38 respectively, which are in mesh with worm gears 39 and 40 on shafts 41 and 42. The shaft 41 is provided with a worm 43 which is adapted to mesh with worm teeth 44 formed on a flange of the driving member 12. This shaft 41 is mounted to receive an oscillatory movement about shaft 35, as indicated most clearly by the full and dotted lines in Figure 5. This admits of throwing the worm gear 43 into or out of meshing engagement with the worm teeth 44 of the driving member 12.

A spring 45 normally exerts a pulling force upon the inner end of the shaft 41, to hold the gear elements 43 and 44 in engagement under normal conditions. When the shaft 41 is in gear with the driving member 12, the dial 3 is locked and held against rotation. This is accomplished by means of a locking dog 46 mounted upon the shaft 41, and adapted to engage one of a number of notches 47 formed in the lower edge of the ring 7.

When the outer end of the shaft 41 is moved into the dotted line position, as indicated in Figure 5, the inner end is moved so as to carry the locking dog 46 away from the notches 47 of the ring 7, thereby releasing the dial 3 which may be turned to bring any required registering mechanism into position to be read. The locking dog 46 is directed in its movements by means of a guide 48 projecting from the column 9 or other convenient part of the main frame.

The shaft 42 is mounted in a similar manner to the shaft 40, so as to receive an oscillatory movement about the shaft 36, and is provided with a worm gear 49 which is adapted to mesh with the worm teeth 20 of the driving member 17. A locking dog 50 mounted upon the shaft 42 is adapted to engage any one of a plurality of notches 51 formed in a flange depending from the dial 4, so as to normally hold such dial against rotation.

A spring 52 normally holds the worm gear 49 of the shaft 42 in meshing engagement with the worm gear 20 of the driving member 17. A guide 53 projecting inward from the casing 1 directs the locking dog 50 in its movements. When the outer end of the shaft 42 is moved in the direction of the arrow indicated in Fig. 5, the inner end of the shaft moves to carry the worm gear 49 away from and out of meshing engagement with the teeth of the driving member 17, and at the same time the locking dog 50 is moved out of engagement with the notch 51 of the dial 4, thereby admitting of the latter being rotated to bring the desired registering mechanism carried thereby into reading position. Under normal conditions the shafts 41 and 42 are in meshing engagement with the respective drive members 12 and 17 and the locking dogs 46 and 50 are in locking engagement with parts connected with the respective dials 3 and 4, so as to hold the same against rotation.

As hereinbefore stated, means are provided for operating the registering mechanisms to admit of setting the same to zero or to any point of registration. These means are under control of the operator, and embody a shaft 54 which is mounted to receive both a longitudinal and a rotary movement.

Crown gear wheels 55 and 56 are mounted upon the shaft 54 to move therewith, and these gear wheels may be caused to engage with the driven members 11 and 23 of the respective registering mechanisms 10 and 22. The driven member 11 is formed with a spur gear 57, which is adapted to mesh with the teeth of the gear wheel 55. The driven member 23 is provided with a gear wheel 58, which is adapted to mesh with the teeth of the gear wheel 56. The shaft 54 may be moved to any one of three positions, so as to cause the gear wheels 55 and 56 to clear the gear wheels 57 and 58 or to engage with such gear wheels according as one or the other of the registering mechanisms are to be reset or moved to any given adjusted position. Outward movement of the shaft 54 brings the teeth of the gear wheel 55 into engagement with the teeth of the gear wheel 57 when rotation of the shaft 54 will either reset registering mechanism 10 or move the same to any required position. Inward movement of the shaft 54 brings the teeth of the gear wheel 56 into engagement with the teeth of the gear wheel 58 thereby admitting of resetting of the registering mechanism 22 or adjustment thereof to any desired position.

The shaft 54 projects beyond the casing and is provided at its outer end with a suitable grip 58ˣ. A spring 59 secured to the casing cooperates with a stop 60 mounted upon the shaft 54 to hold the latter in any one of its three adjusted positions.

All of the registering mechanisms may be thrown into or out of operation. This result is effected by means of a shipper mechanism, the same comprising an arm 61 which is mounted to receive a two-fold movement. The inner end of the arm 61 is formed, or otherwise provided with a pintle 62, which is mounted in upper and lower bearings of a bracket 63 forming a part of the supporting frame and projecting outward from the column 9. A pair of fingers 64 project laterally from the pintle 62 in spaced relation so as to receive between them the gear elements 11 and 23, as indicated most clearly by the full and dotted lines in Figure 2.

The outer end of the arm 61 projects beyond the casing 1 and extends through an opening formed therein. A plate 65 is secured to the outer side of the casing 1 and is formed with a substantially H-shaped slot 66, through which the outer end of the arm 61 projects. A flange surrounds the H-shaped slot 66 and projects outwardly therefrom, and this flange is depressed to form three cams 67, 68 and 69, corresponding to the several parts constituting the H form of the slot 66.

The cam 67 has a relative longitudinal disposition whereas the cams 68 and 69 are vertically disposed, being arranged at a right angle to the cam 67. Each of the cams is centrally depressed, and rises towards the extremities of the respective parts of the slot with the result that when the arm 61 is unrestrained, it assumes and maintains a normal position, that is, with the fingers 64 out of the path of the driven members 11 and 23, so as not to interfere with the free movement of the registering mechanisms and their carrying dials.

A button 70 is provided at the outer end of the arm 61, and constitutes an abutment for the outer end of an expansible helical spring 71. A pressure piece 72 is loosely mounted upon the projecting end of the arm 61 and constitutes an abutment for the inner end of the spring 71. The inner face of the pressure piece 72 is made round, and is adapted to ride upon the several cams 67, 68 and 69, so as to insure the return of the arm to a normal position when released, after being manually operated.

Under normal conditions, the outer end of the arm 61 occupies a central position of the H-shaped slot 66, thereby maintaining the fingers 64 midway between the driven gears 11 and 23, which they control. Movement of the outer end of the arm 61 to the left in Fig. 7 brings the extremities of the fingers 64 in position to engage the driven member 11 of the registering mechanism adjacent the arm. The outer end of the arm 61 is now in registering position with the vertical member of the H-shaped slot corresponding to the position of the cam 68, and upward movement of the arm brings the driven member 11 in meshing engagement with the teeth 73 of the driving member 12. Downward movement of the arm 61 throws the driven member out of engagement with teeth 73 of the drive member 12 and into position to be engaged by the gear wheel 56 of the resetting mechanism, as shown in Fig. 2. In this connection it is to be understood that the driven member 11 of the registering mechanism may be moved to the desired position, and is maintained in such position by any suitable means such for example as the well known device of a friction spring bearing against the shaft.

Movement of the outer end of the arm 61 to the right in Fig. 2 from normal position causes the extremities of the fingers 64 to extend across the path of the driven member 23 of the outer registering mechanisms 22. This brings the outer end of the arm 61 in registering position with that portion of the H-shaped slot corresponding to the cam 69, and upward movement of the arm brings the driven member 23 in meshing engagement with the teeth of the drive member 17, and downward movement of the arm 61 throws the driven member 23 out of engagement with the drive member 17, and into position to be engaged by the gear wheel 56 of the resetting mechanism, as indicated most clearly by the dotted lines in Fig. 2.

It is to be understood that the dial 2 is provided with an opening to admit of reading the registering mechanisms when the latter are brought to a predetermined position to be read. In the present instance two sets of openings 74 and 75 are formed in the dial 2 in position for exposing the outer and the inner registering mechanisms. The dials 3 and 4 are adapted to be turned to bring the required registering mechanism carried thereby into position opposite the respective openings 75 and 74 so as to be read. Before rotating either one of the dials it is necessary to operate one or the other of the shafts 41 and 42 in order to effect a release of the dial and also to throw the driving mechanism out of operation, thereby preventing actuation of the registering mechanisms during the rotation of the dial.

Each of the rotatable dials 3 and 4 is provided with suitable legends or other matter indicating some item upon which tally is to be kept. These legends or designating matter correspond with the several registering mechanisms so that when the legend is brought into a given position, the indication of the registering mechanism corresponding therewith may be read through the observation opening provided in the dial 2.

As shown most clearly in Figure 1, the inner observation opening 75 is of larger extent than the outer observation openings, so that any legend or other matter provided upon the movable dial may be read in addition to the indication of the registering mechanism. The operator will thus be advised when it is necessary to replenish gasoline or other motive fluid or to take on a new supply of oil or to lubricate any particular part of the mechanism. If it be required to supply the differential with grease at every 1,000 miles, more or less, the dial 3 may be moved to bring the registering mechanism of such indication in position to be read, and when the dial 3 is moved to bring the legend "Every 1,000 miles" opposite the observation opening 75, further legends will appear opposite such observation opening directing the operator to supply grease to the differential, and the registering mechanism will indicate the odometer reading, so that when 1,000 miles or approximately this distance has been traveled, the operator will be advised that it is necessary to replenish the differential.

By moving the dial 3 to bring the indication "Gasoline" opposite the observation opening 75, the operator will be informed as to the condition of the supply of gasoline on hand, thereby enabling a supply being obtained in ample time because the gasoline register shows how much he supplied at the beginning of his trip and the trip register shows the trip mileage, and he knows how much gasoline should be used for a given mileage. The dial 3 will also be provided with registering mechanisms indicating the mileage of a trip, as well as the total mileage. The outer dial 4 will be provided with registering mechanism to indicate the mileage for each tire in service, as well as the spares. The registering mechanisms corresponding to the tires in service are maintained in operative position, whereas the registering mechanism corresponding with the spares are thrown out of operative position, and are only brought into operative position when the spare is placed in service. At this time the registering mechanism corresponding to the tire removed from service is thrown out of operation to prevent actuation thereof.

It will be understood from the foregoing taken in connection with the accompanying drawings, that provision is had for keeping tally upon the mileage of the tires, as well as the distance of any particular trip or the total mileage, as also registering the amount of oil, grease and motive fluid, used in any given distance. It is further observed that provision is had for selecting and throwing the several mechanisms into and out of operative position, and for bringing any desired registering mechanism in position to be read.

I claim:

1. The combination of a plurality of movable dial carrying members, a number of registers carried by each such member and brought by the member movement to a common reading point, each member being movable independently of another, and a common operating means for registers of all the members.

2. The combination of a plurality of independently rotatable dial carrying members, of different diameter and mounted concentrically, a number of registers carried by each member and brought by the rotation of the member to a common reading point, and a common operating means for registers of all the members.

3. The combination of a number of registers, a movable support for them that brings them in succession to a common reading point, driving mechanism for said registers including a rotatable member shiftable to different positions in which, respectively, the working relation of the parts is broken and restored, and an automatic lock for said movable support that releases and secures the latter, respectively, when said working relation is broken and restored.

4. The combination of a plurality of independently rotatable dial carrying members, of different diameter and mounted concentrically, and a number of registers carried by each member and brought by the rotation of said member to a common reading point.

MARVIN SMITHEY.